United States Patent
Foss

(10) Patent No.: US 10,394,055 B2
(45) Date of Patent: Aug. 27, 2019

(54) DUAL-FRAME EYEGLASSES

(71) Applicant: Arthur N. Foss, Seattle, WA (US)

(72) Inventor: Arthur N. Foss, Seattle, WA (US)

( * ) Notice: Subject to any disclaimer, the term of this patent is extended or adjusted under 35 U.S.C. 154(b) by 166 days.

(21) Appl. No.: 15/423,401

(22) Filed: Feb. 2, 2017

(65) Prior Publication Data

US 2018/0217403 A1    Aug. 2, 2018

(51) Int. Cl.
*G02C 7/08*  (2006.01)
*G02C 5/08*  (2006.01)
*G02C 5/00*  (2006.01)
*G02C 5/22*  (2006.01)

(52) U.S. Cl.
CPC .............. *G02C 7/08* (2013.01); *G02C 5/006* (2013.01); *G02C 5/08* (2013.01); *G02C 5/2263* (2013.01); *G02C 2200/02* (2013.01); *G02C 2200/18* (2013.01)

(58) Field of Classification Search
CPC .......... G02C 7/08; G02C 7/086; G02C 7/088; G02C 9/00; G02C 9/02
USPC ................................ 351/57, 58, 59
See application file for complete search history.

(56) References Cited

U.S. PATENT DOCUMENTS

| | | | | |
|---|---|---|---|---|
| 6,464,354 B1 * | 10/2002 | Chen | ................ | G02C 5/2263 351/119 |
| 6,474,811 B2 * | 11/2002 | Liu | .................... | G02C 9/02 351/47 |
| 7,040,749 B2 * | 5/2006 | Smith | ................. | G02C 9/00 351/47 |
| 7,229,168 B2 * | 6/2007 | Kidouchim | ............... | A61F 9/04 16/228 |
| 7,325,922 B2 * | 2/2008 | Spivey | .................... | G02C 7/02 351/159.04 |
| 8,210,676 B1 | 7/2012 | Hunt | | |
| 2007/0091257 A1 | 4/2007 | Spivey | | |
| 2009/0279046 A1 * | 11/2009 | Dreher | ................... | G02C 7/081 351/55 |

(Continued)

FOREIGN PATENT DOCUMENTS

| CN | 104166246 B | | 4/2016 |
|---|---|---|---|
| CN | 105759459 A | * | 7/2016 |
| CN | 105759459 A | | 7/2016 |

OTHER PUBLICATIONS

English machine translation of CN-105759459-A (Year: 2016).*
PCT/US18/16606, International Search Report and Written Opinion, dated Jul. 11, 2018, 15 pages.

*Primary Examiner* — Nicholas R. Pasko
(74) *Attorney, Agent, or Firm* — Han Santos, PLLC

(57) ABSTRACT

An apparatus for dual-frame eyeglasses is described that includes a foundation eyeglass frame that may be worn on the user's head, and a pivot eyeglass frame that is rigidly coupled to the foundation eyeglass frame via a pair of pivot mechanisms. The pivot eyeglass frame may be substantially similar in form and profile to the foundation eyeglass frame. The pivot eyeglass frame may be configured to incrementally rotate about the pivot mechanism from a first position that substantially overlaps a user's line of sight through to a second position that is angularly offset away from the user's line of sight. Additionally, the foundation eyeglass frame may include a nose bridge that separates into two elements at a coupling point on the nose bridge to facilitate each half of the foundation eyeglass frame folding into a separate, compact form.

20 Claims, 16 Drawing Sheets

(56) References Cited

U.S. PATENT DOCUMENTS

2015/0219930 A1* 8/2015 Cohn .................. G02C 5/2263
　　　　　　　　　　　　　　　　　　　351/59

* cited by examiner (Exploded View of FIG. 3A)

(Exploded View of FIG. 4A)

(Section A-A of FIG. 5A)

View A

View B (Exploded View of FIG. 6A)

(View A of FIG. 6B)

(View B of FIG. 6B)

DETAIL A (Detail A of FIG. 8A)

DUAL-FRAME EYEGLASSES

BACKGROUND

Eyeglasses are widely used to correct vision, protect eyes from sun or debris, and/or for other purposes. Many people may use eyeglasses while performing particular tasks, and choose to remove their eyeglasses when they are not in use. For example, a user may be momentarily reading text that would necessitate wearing corrective lens eyeglasses, or momentarily performing a task that would necessitate wearing protective eyeglasses. In each of these instances, the user may prefer to use their pair of corrective lens eyeglasses or protective eyeglasses, while performing their particular task, and then store each respective pair of eyeglasses away for future use. However, it can be difficult, and at times, inconvenient for a user to find a place to store their eyeglasses when they are not in use, particular when eyeglasses are being used intermittently with short time intervals between each use. This may lead to eyeglasses becoming lost or damaged.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1A illustrates a front view of the pair of dual-frame eyeglasses. FIG. 1B illustrates a plan view of the pair of dual-frame eyeglasses.

FIG. 3A illustrates a plan view of the pivot mechanism, and FIG. 3B illustrates an exploded view of the pivot mechanism shown in FIG. 3A.

FIG. 4A illustrates a plan view of the pivot mechanism, and FIG. 4B illustrates an exploded view of the pivot mechanism shown in FIG. 4A.

FIG. 5A illustrates a plan view of the dual frame eyeglasses, showing the pair of arm catches. FIG. 5B illustrates a cross-sectional view through Section A-A of FIG. 5A.

FIG. 6A illustrates a pivot mechanism comprising a pivot plate with a rotational stop and a base plate with a recess seat.

FIG. 7A illustrates a first alignment of the pivot eyeglass frame and the foundation eyeglass frame. FIG. 7B illustrates a second alignment of the pivot eyeglass frame relative to the foundation eyeglass frame.

FIG. 8B illustrates a detail view at Detail A of FIG. 8A.

FIG. 9A illustrates a first configuration of the pair of dual-frame eyeglasses that are unfolded for use. FIG. 9B illustrates a second configuration of the pair of dual-frame eyeglasses, whereby the pair of dual-frame eyeglasses are folded into a compact form.

FIG. 10A illustrates a furthermost angular orientation of the pivot eyeglass frame relative to the foundation eyeglass frame.

FIG. 11A illustrates a furthermost angular orientation of the pivot eyeglass frame relative to the foundation eyeglass frame.

FIG. 12A illustrates a furthermost angular orientation of the pivot eyeglass frame relative to the foundation eyeglass frame.

DETAILED DESCRIPTION

Figure 1A:
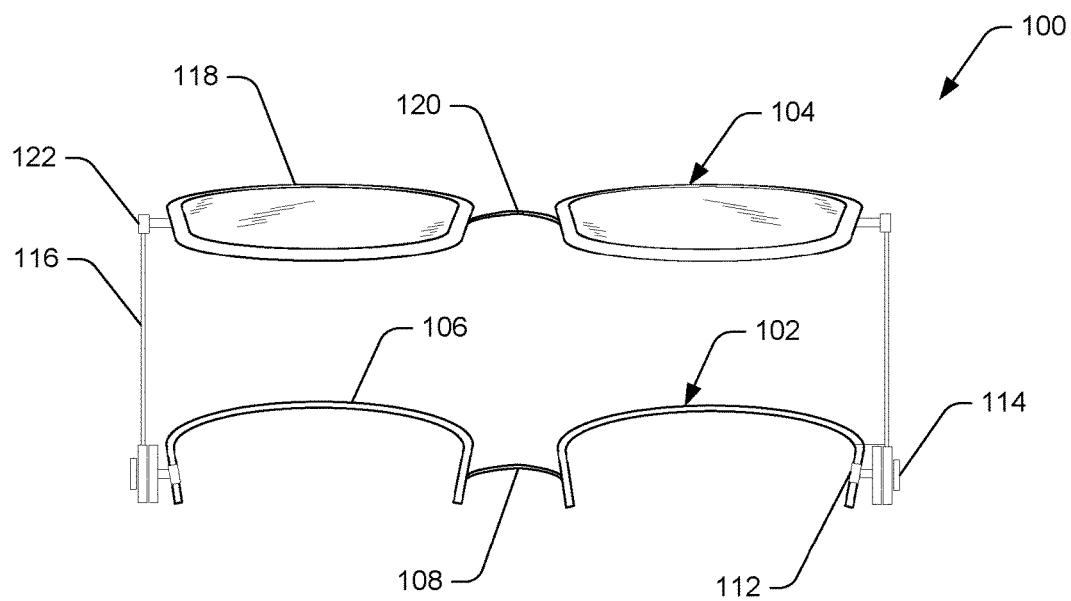
FIGS. 1A and 1B illustrates an exemplary embodiment of a pair of dual-frame eyeglasses.

The disclosure herein describes apparatuses for dual-frame eyeglasses. The dual-frame eyeglasses may include a first set of eyeglasses and a second set of eyeglasses that are rigidly coupled to each other via a pair of pivot mechanisms. In some examples, the first set of eyeglasses, also known as a foundation eyeglass frame, may be worn on the user's head. In some examples, foundation eyeglass frame may resemble a typical eyeglass frame without a pair of eyeglass lenses. This configuration may allow a user to avoid seeing through lenses while still wearing the pair of dual-frame eyeglasses. In other examples, the foundation eyeglass frame may include a pair of lenses that are different to lenses installed on the pivot eyeglass frame. This configuration may allow a user to selectively see through a first pair of lenses of the foundation eyeglass frame, and optionally through a combination of the first pair of lenses and a second pair of lenses of the second set of eyeglasses. The lenses may include corrective lenses, protective lenses, sunglass lenses, or any other type of eyeglass lens. Further, the second set of eyeglasses, also known as a pivot eyeglass frame, may be rigidly coupled to the foundation eyeglass frame via a pair of pivot mechanisms. In some examples, each pivot mechanism may be integrated into the temple arms of the foundation eyeglass frame. In some examples, the pivot mechanism may facilitate a coupling of the foundation eyeglass frame and a pivot eyeglass frame via a set of magnets, fasteners, or a combination of both. The term 'coupled' may refer to two or more elements that are in direct physical contact. However, 'coupled' may also refer to two or more elements that are not in direct contact with each other, but yet still cooperate or interact with each other.

Moreover, the pivot eyeglass frame may be substantially similar in form and profile to the foundation eyeglass frame. The pivot eyeglass frame may be configured to rotate about the pivot mechanism of the foundation eyeglass frame. The pivot mechanism, comprising of pivot elements and alignment elements, may facilitate the pivot eyeglass frame to incrementally rotate from an initial position that substantially overlaps a user's line of sight through to a subsequent position that represents a furthermost rotation of the pivot eyeglass frame relative to the foundation eyeglass frame. In some examples, the pivot mechanism may facilitate one or more intermediate orientations of the pivot eyeglass frame that lie between the above-referenced initial and subsequent positions.

In some examples, the foundation eyeglass frame may include a nose bridge that separates into two elements at a coupling point. The purpose of separating the nose bridge into two elements permits each half of the foundation eyeglass frame to fold into a separate, compact form. Further, the two elements of the nose bridge may be selectively coupled, and uncoupled, using magnets that are rigidly fixed to the free ends of each element at the coupling point.

Figure 1B:
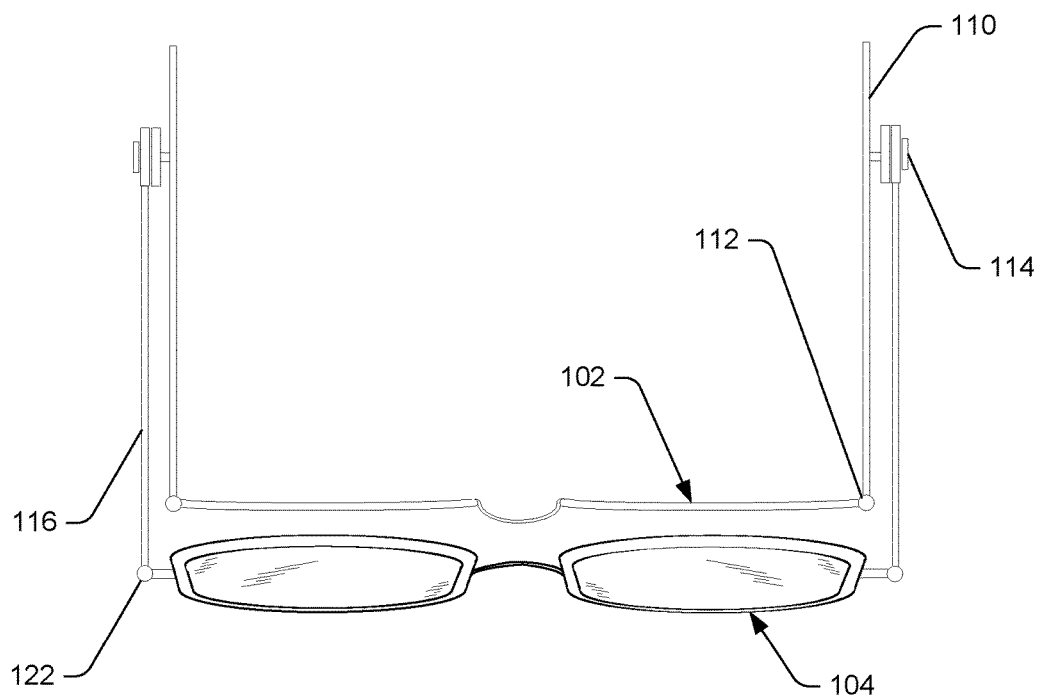

FIGS. 1A and 1B illustrates an exemplary embodiment of a pair of dual-frame eyeglasses 100. The dual-frame eyeglasses 100 may comprise of a foundation eyeglass frame 102 and a pivot eyeglass frame 104. The foundation eyeglass frame 102 may be configured to be worn directly on a user's head. In the illustrated example, the foundation eyeglass frame 102 may include a foundation-lens support frame 106 that comprises of a left and right portion, configured to selectively hold a pair of lenses in place in front of a user's line-of sight. In some examples, the foundation eyeglass frame 102 may be configured without a pair of eyeglass lenses installed. The purpose of doing so is to allow a user to selectively avoid seeing through lenses while wearing the pair of dual-frame eyeglasses 100. For example, a user may choose to see through lenses installed on the second, pivot eyeglass frame 104 by rotating the pivot eyeglass frame 104 in a downward direction, such that the lenses of the pivot eyeglass frame 104 are positioned in front of the user's line-of-sight. At a point in time when a user chooses not to see through the lenses, rather than having to remove the pair of dual-frame eyeglasses 100, the user may rotate the pivot eyeglass frame 104 in an upward direction, so that the lenses of the pivot eyeglass frame 104 no longer obstruct the user's line of sight.

The foundation eyeglass frame 102 may include a nose bridge 108 that is rigidly fixed to the left and right portions of the foundation-lens support frame 106. The nose bridge 108 may be formed to contour over a user's nose when the dual-frame eyeglasses 100 are worn on the user's head. The nose bridge 108 may further include a coupling mechanism that selectively couples, and uncouples the nose bridge 108 into two elements. In turn, this may permit a left and right portion of the foundation eyeglass frame 102 to fold into separate, compact forms.

The foundation eyeglass frame 102 may further include a pair of temple arms 110. One end of each temple arm may be rigidly fixed to a left or right side of the foundation-lens support frame 106, via a hinge 112. Further, the opposing free end of each temple arm 110 may be bent to wrap around the back of a user's ear while the dual-frame eyeglasses are worn on the user's head.

In the illustrated example, a pair of pivot mechanisms 114 may be rigidly fixed to each temple arm 110. The pair of pivot mechanisms 114 may couple the foundation eyeglass frame 102 to the pivot eyeglass frame 104 and further permit the pivot eyeglass frame 104 to incrementally rotate from an initial position in front of a user's line of sight through to a subsequent position that is angularly offset above a user's line of sight. In some examples, the pair of pivot mechanisms 114 may facilitate one or more intermediate orientations of the pivot eyeglass frame 104 relative to the foundation eyeglass frame 102 that lie between the above-referenced initial and subsequent positions.

Moreover, the pivot eyeglass frame 104 may include a pivot-lens support frame 118 that comprises a left and right portion for holding a pair of lenses. The pair of lenses may include corrective lenses, protective lenses, sunglass lenses, or any other type of eyeglass lens. Further, the pivot eyeglass frame 104 may comprise of a pivot-frame nose bridge 120 that is rigidly fixed to a left and right portion of the pivot-lens support frame 118. One end of each pivot arm 116 may be rigidly fixed to a left or right side of the pivot-lens support frame 118, via a hinge 122. The opposing free end of each pivot arm 116 may be rigidly fixed to one of the pair of pivot mechanisms 114 that permit the pivot eyeglass frame 104 to rotate relative to the foundation eyeglass frame 102.

Figure 2A:
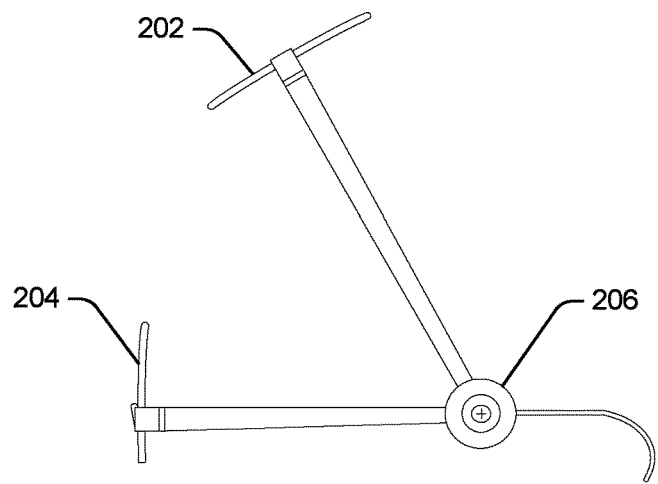
FIGS. 2A through to 2C illustrate an exemplary embodiment of the dual-frame eyeglasses, showing different angular orientations of a pivoting eyeglass frame relative to a foundation eyeglass frame.

FIGS. 2A through to 2C illustrate an exemplary embodiment of the dual-frame eyeglasses, showing different angular orientations of a pivot eyeglass frame 202 relative to a foundation eyeglass frame 204. The pivot eyeglass frame 202 and the foundation eyeglass frame 204 correspond to pivot eyeglass frame 104 and foundation eyeglass frame 102, respectively. Further, FIG. 2A illustrates a first configuration whereby the pivot eyeglass frame 202 is at a furthermost rotation away from a user's line of sight. A user may elect to move the pivot eyeglass frame 202 into the first configuration at a time when the user chooses not to see through the lenses of the pivot eyeglass frame 202, and would instead prefer to continue wearing the pair of dual-frame eyeglasses. The pivot eyeglass frame 202 may rotate about a pair of pivot points, defined by a pair of pivot mechanisms 206 that are rigidly fixed onto each temple arm of the foundation eyeglass frame 204. The pair of pivot mechanisms 206 may correspond to the pair of pivot mechanisms 114.

Figure 2B:
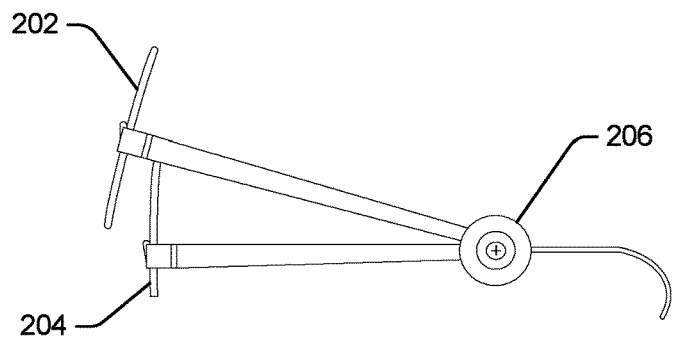
Figure 2C:
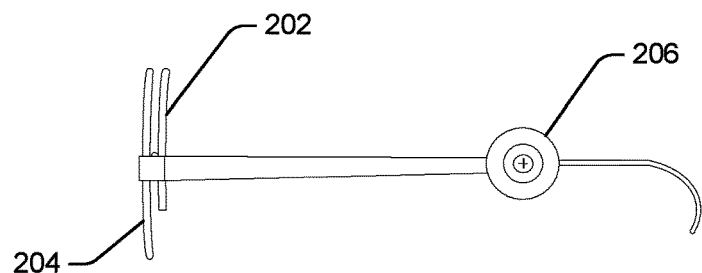

FIG. 2B illustrates a second configuration of the pivot eyeglass frame 202 relative to the foundation eyeglass frame 204. The pivot mechanism 206 may be configured to enable the pivot eyeglass frame 202 to selectively couple to the foundation eyeglass frame 204 at intermediate angular orientations that lie between the user's line of sight and the furthermost orientation shown in FIG. 2A. Further, FIG. 2C illustrates a third configuration of the pivot eyeglass frame 202 whereby the pivot eyeglass frame 202 substantially overlaps the foundation eyeglass frame 204, and the user's line of sight. A user may elect to move the pivot eyeglass frame 202 into the third configuration at a time when the user chooses to see through the lenses of the pivot eyeglass frame 202.

Figure 3B:
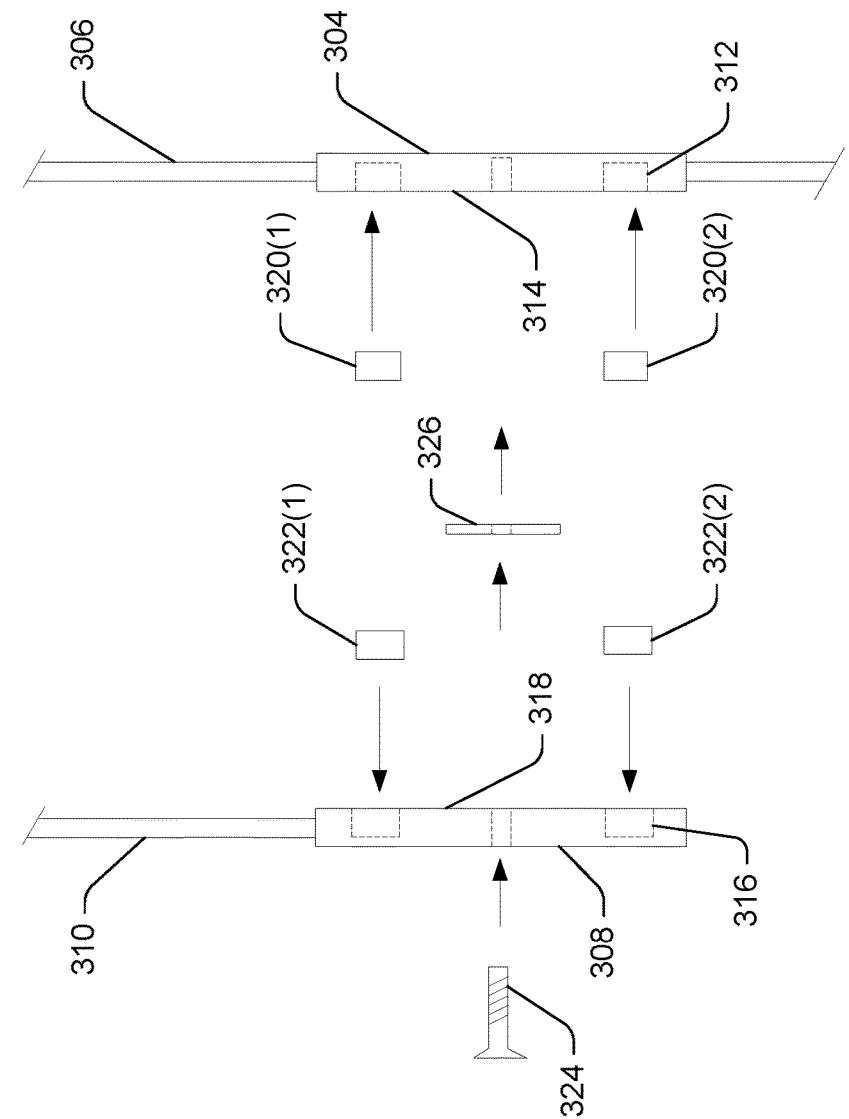
FIGS. 3A and 3B illustrate an exemplary embodiment of a pivot mechanism for the dual-frame eyeglasses. Particularly.
Figure 3A:
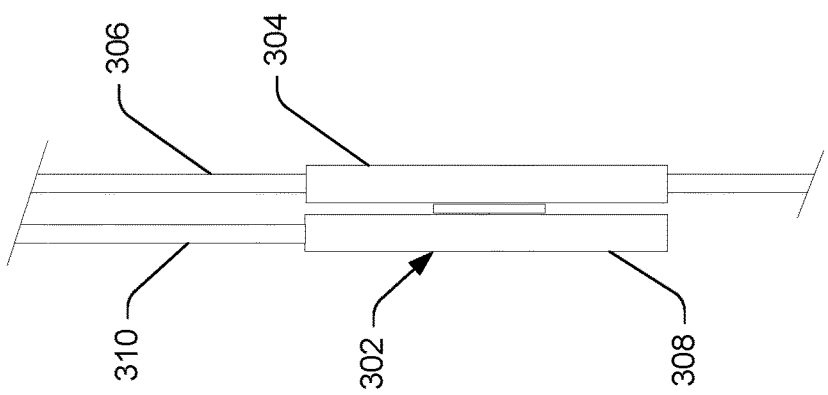

FIGS. 3A and 3B illustrate an exemplary embodiment of a pivot mechanism 302 for the dual-frame eyeglasses. Particularly, FIG. 3A illustrates a plan view of the pivot mechanism 302, and FIG. 3B illustrates an exploded view of the pivot mechanism 302 shown in FIG. 3A. In various examples, the pivot mechanism 302 may facilitate a coupling between the foundation eyeglass frame and the pivot eyeglass frame, while also allowing the pivot eyeglass frame to incrementally rotate between positions that substantially overlap a user's line of sight through to a furthermost rotation away from the user's line of sight.

Moreover, the pivot mechanism 302 may comprise of a base plate 304 that is rigidly fixed to a temple arm 306 of the foundation eyeglass frame, and a pivot plate 308 that is rigidly fixed to the pivot arm 310 of the pivot eyeglass frame. The base plate 304 and the pivot plate 308 may substantially abut one another to form the pivot mechanism 302. In an alternate configuration, the base plate 304 may be rigidly fixed to the pivot arm 310 of the pivot eyeglass frame, and the pivot plate 308 may be rigidly fixed to the temple arm 306 of the foundation eyeglass frame.

In the illustrated example, the base plate 304 may include a plurality of recess seats 312 etched into a mating surface 314 that abuts the pivot plate 308. Similarly, the pivot plate 308 may include a plurality of recess seats 316 etched into a mating surface 318 that abuts the base plate 304. Each of the recess seats 312 and 316 may receive a magnet that, in part, may facilitate a coupling between the base plate 304 and the pivot plate 308.

For example, magnets 320 may nest within the recess seats 312 of the base plate 304, and magnets 322 may nest within the recess seats 316 of the pivot plate 308. The magnets 320 of the base plate 304 may have a polarity that is substantially opposite to a polarity of the magnets 322 of the pivot plate 308. As a result, a magnetic force generated between magnets 320 and magnets 322 may selective couple the pivot plate 308 to the base plate 304.

In various examples, the recess seats 312 and 316 within each of the base plate 304 and the pivot plate 308 may be formed to a particular depth and cross-section that is substantially similar to an exterior profile of magnets 320 and 322 that are nested therein. Thus, the exposed surface of magnet 320 and 322 may be flush and coplanar with the mating surface 314 of the base plate 304 and the mating surface 318 of the pivot plate 308, respectively. This ensures that the presence of magnets 320 and 322 does not mechanically interfere with the rotation of pivot plate 308 relative to the base plate 304.

Furthermore, a fastener 324 may rigidly fix the base plate 304 and the pivot plate 308 to one another, through the rotational centroid of the pivot mechanism 302. The fastener 324 may comprise of a screw, bolt, lock-pin, or any other fastening system that facilitates rotation of the pivot plate 308 relative to the base plate 304 about an axis perpendicular to the adjoining pivot plate 308 and base plate 304, while also restricting translation of the pivot plate 308 relative to the base plate 304. In some examples, a fastener 324 may pass through a spacer 326 that is positioned between the base plate 304 and the pivot plate 308. The spacer 326 may be included as a sacrificial component to limit surface abrasion between the mating surface 314 of the base plate 304 and the mating surface 318 of the pivot plate 308.

Figure 4B:
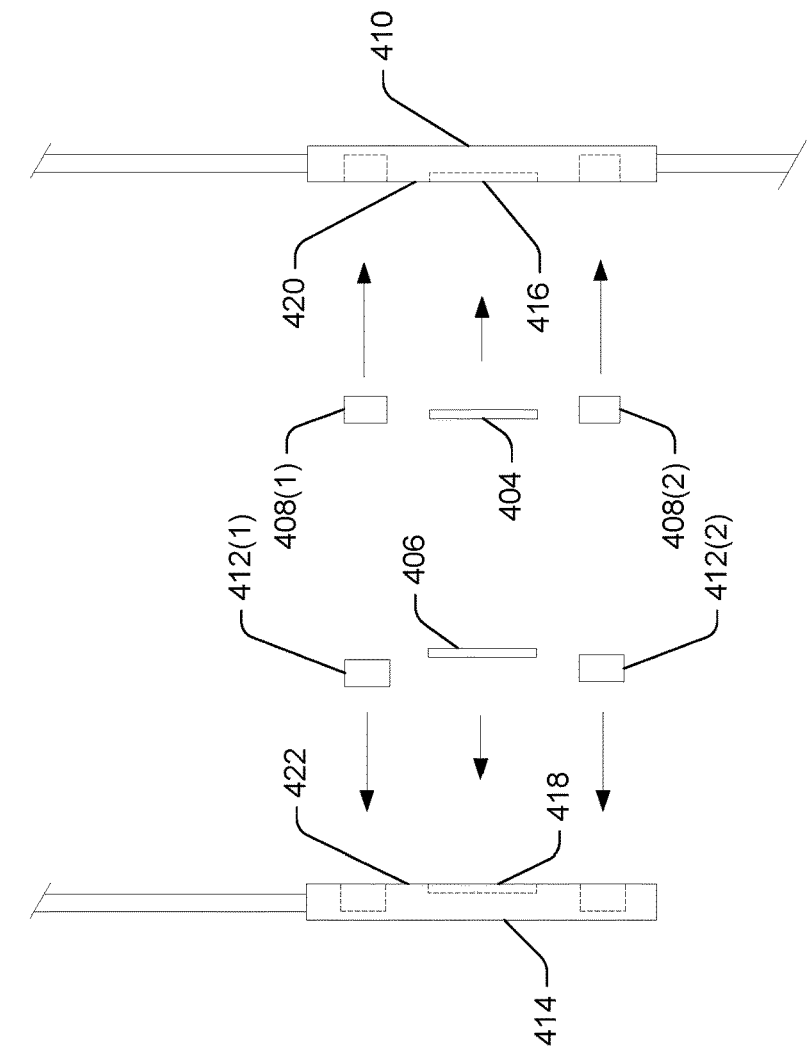
FIGS. 4A and 4B illustrate an exemplary embodiment of a pivot mechanism for the dual-frame eyeglasses. Particularly.
Figure 4A:
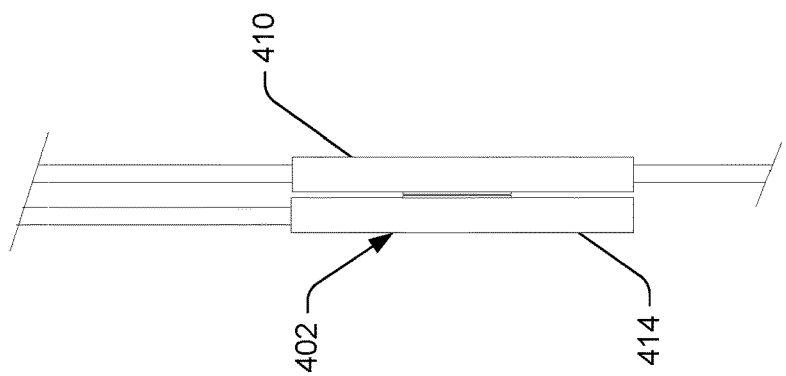

FIGS. 4A and 4B illustrate an exemplary embodiment of a pivot mechanism 402 for the dual-frame eyeglasses. Particularly, FIG. 4A illustrates a plan view of the pivot mechanism, and FIG. 4B illustrates an exploded view of the pivot mechanism 402 shown in FIG. 4A. In various examples, the pivot mechanism 402 is substantially similar to the pivot mechanism 302 of FIGS. 3A and 3B, but for the exclusion of fastener 324 and spacer 326, and the inclusion of pivot magnets 404 and 406 at a rotational axis of the pivot mechanism 402. The magnets 408 that nest within the base plate 410 may correspond to magnets 320, and the magnets 412 nested within the pivot plate 414 may correspond to magnets 322. Moreover, rather than having fastener 324 facilitate rotation of the pivot plate 308 relative to the base plate 304, as illustrated in FIGS. 3A and 3B, the pivot mechanism 402 may comprise of a pair of pivot magnets 404 and 406 that nest within a recess seat 416 of the base plate 410 and a recess seat 418 of the pivot plate 414, respectively. The pair of pivot magnets 404 and 406 may be positioned at the rotational centroid of the base plate 410 and pivot plate 414 respectively.

Furthermore, the pivot magnet 404 of the base plate 410 may have a polarity that is substantially opposite to a polarity of the pivot magnet 406 of the pivot plate 414. As a result, a magnetic force generated between the pivot magnet 404 and 406 may selectively couple and facilitate rotation of the pivot plate 414 relative to the base plate 410, while restricting translation of the pivot plate 414 relative to the base plate 410.

In some examples, the recess seat 416 within the base plate 410 that houses the pivot magnet 404 may be formed with a cross-section that is substantially similar to an exterior profile of the pivot magnet 404, and with a depth that is less than the thickness of the pivot magnet 404. Thus, the exposed surface of the pivot magnet 404 may be coplanar and proud of a mating surface 420. Similarly, the recess seat 418 within the pivot plate 414 that houses pivot magnet 406 may be formed with a cross-section that is substantially similar to an exterior profile of pivot magnet 406, and with a depth that is less than the thickness of the pivot magnet 406. Similar to the base plate 410 configuration, the exposed surface of pivot magnet 406 may be coplanar and proud of the mating surface 422. By configuring the pivot magnet 404 and 406 to nest proud of their respective mating surfaces 420 and 422, the mating surfaces 420 and 422 may not contact one another, while the pivot magnets 404 and 406 are selectively coupled. In other words, the pivot magnet 404 and 406 may limit abrasion between the mating surface 420 of the base plate 410 and the mating surface 422 of the pivot plate 414, while the pivot plate 414 rotates relative to the base plate 410.

Figure 5A:
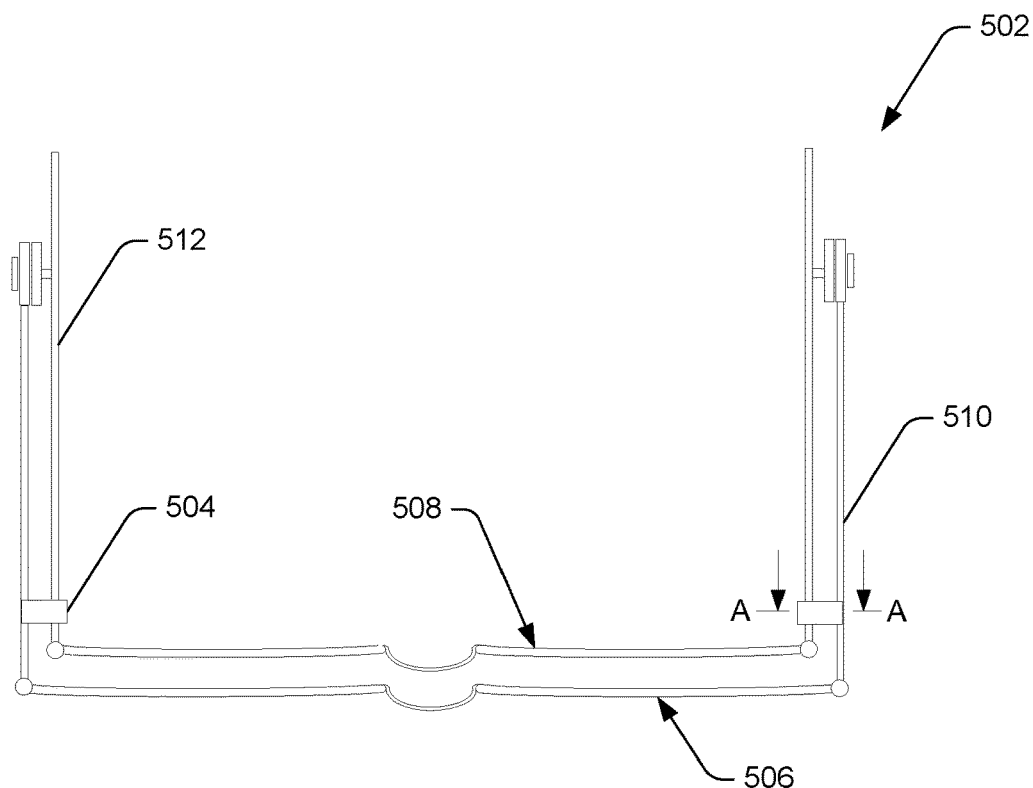
FIGS. 5A and 5B illustrate an exemplary pair of arm catches that limit rotation of the pivot eyeglass frame relative to the foundation eyeglass frame.

FIG. 5A illustrates a plan view of a pair of the dual frame eyeglasses 502, showing a pair of arm catches 504 that limits a rotation of the pivot eyeglass frame 506 relative to a foundation eyeglass frame 508. Each of the arm catches 504 may provide a mechanical stop that limits rotation of each pivot arm 510 of the pivot eyeglass frame 506 relative to an intersecting temple arm 512 of the foundation eyeglass frame 508. In other words, each of the arm catches 504 may help prevent the pivot eyeglass frame 506 from rotating below the line of sight of the user. It is noteworthy that the line of the sign of the user may be defined by an orientation of the user relative to the foundation eyeglass frame 508.

Figure 5B:
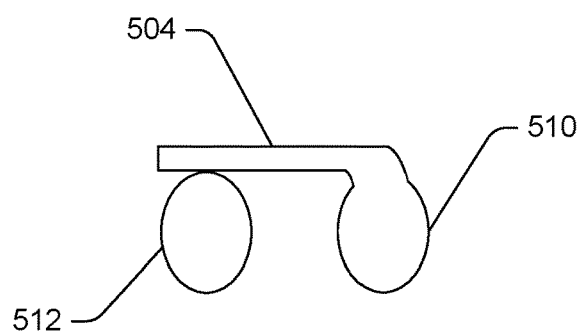

FIG. 5B illustrates a cross-sectional view through Section A-A of FIG. 5A. In the illustrated example, the pair of arm catches 504 are integrated into each pivot arm 510 of the pivot eyeglass frame 506. In other examples, the pair of arm catches 504 may be rigidly fixed to the temple arm 512 of the foundation eyeglass frame 508.

Figure 6A:
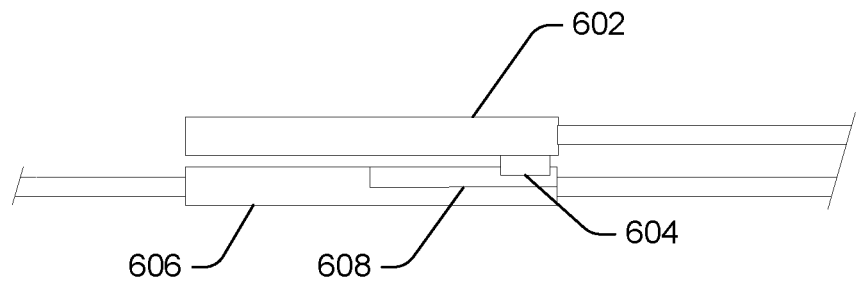
FIGS. 6A through to 6D illustrate an exemplary pivot mechanism of the dual-frame eyeglasses.

FIG. 6A illustrates an exemplary pivot mechanism, comprising a pivot plate 602 with a rotational stop 604 and a base plate 606 with a recess seat 608. In this example, the pivot plate 602 and the base plate 606 may cooperatively limit rotation of the pivot eyeglass frame relative to the foundation eyeglass frame, based on an interaction between the rotational stop 604 and the recess seat 608.

In the illustrated example, the rotational stop 604 may comprise of a protrusion that projects from the pivot plate 602 towards the recess seat 608 of the base plate 606. In some examples, the rotational stop 604 may be an integral part of the pivot plate 602. In other examples, the rotational stop 604 may be a separate component that is rigidly fixed onto a mating surface 610 of the pivot plate 602. The mating surface 610 of the pivot plate 602 describes the surface of the pivot plate 602 that substantially abuts a corresponding, mating surface 612 of the base plate 606.

The recess seat 608 of the base plate 606 may be etched into the mating surface 612 of the base plate 606 at a predetermined depth that is substantially sufficient to receive a portion of the rotational stop 604 of the pivot plate 602. The profile of the recess seat 608 is intended to constrain rotation of the pivot plate 602 relative to the base plate 606 based on the rotational travel of the rotational stop 604. For example, the pivot plate 602 may rotate freely relative to the base plate 606, provided the rotational stop 604 of the pivot plate 602 is within the boundary edges of the recess seat 608 the base plate 606. When the rotational stop 604 abuts a boundary edge of the recess seat 608, the pivot plate 602 is constrained from further rotation.

Figure 6B:
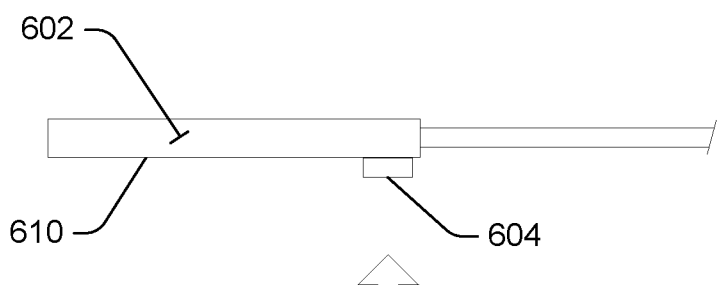
FIG. 6B illustrates an exploded view of FIG. 6A.
Figure 6B:
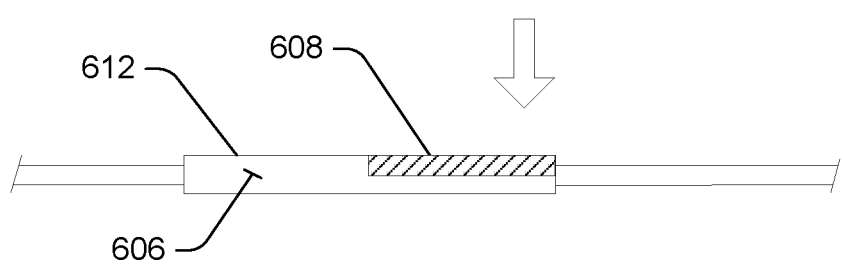

FIGS. 6A and 6B illustrate an assembly of the pivot mechanism, whereby at least a portion of the rotational stop 604 of the pivot plate 602 extends into the recess seat 608 of the base plate 606. The pivot plate 602 may rotate freely relative to the base plate 606, and is only constrained when the rotational stop 604 abuts a boundary edge of the recess seat 608. In the illustrated example, the rotational stop 604 is an integral part of the pivot plate 602, and the recess seat 608 is an integral part of the base plate 606. In other examples, the rotational stop 604 may be an integral part of the base plate 606, or rigidly fixed to the base plate 606, and the recess seat 608 may be an integral part of the pivot plate 602.

Figure 6C:
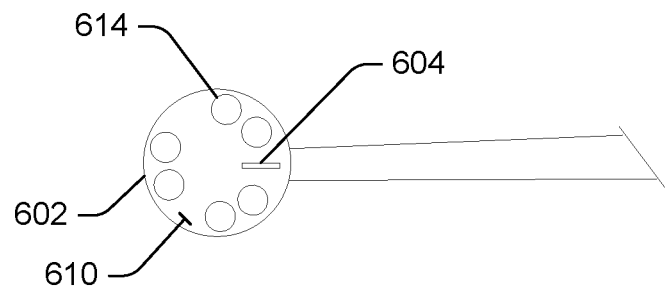
FIG. 6C illustrates a view through View A of FIG. 6B.
Figure 6D:
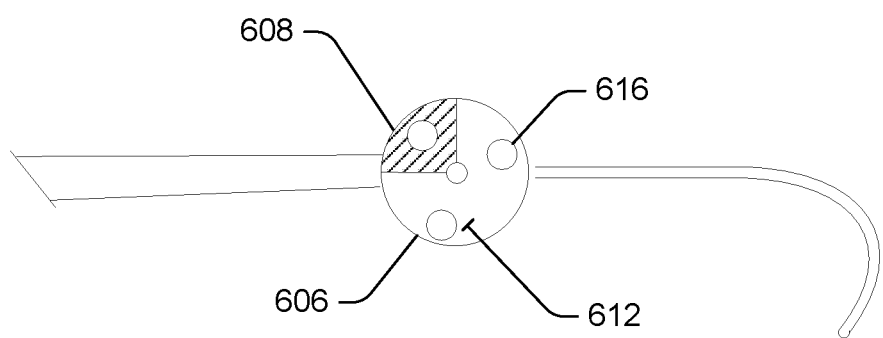
FIG. 6D illustrates a view through View B of FIG. 6B.

FIG. 6C illustrates a view through View A of FIG. 6B showing a pivot plate 602 of the pivot mechanism, with a plurality of magnets 614 in situ, and a rotational stop 604. In the illustrated example, the pivot plate 602 includes three grouped pairs of magnets 614, six magnets in total. In other examples, the pivot plate 602 may include any number of magnets 614 spaced circumferentially on the mating surface 610 of the pivot plate 602. FIG. 6D illustrates a view through View B of FIG. 6B showing a base plate 606 of the pivot mechanism, with three magnets 616 insitu, and a recess seat 608. In the illustrated example, the profile of the recess seat 608 is substantially equivalent to one quadrant of the base plate 606. Thus, an interfacing, pivot plate 602 may rotate freely relative to the base plate 606 provided the rotational stop 604 of the pivot plate 602 remains within the boundary edges of the recess seat 608 quadrant. In other examples, the profile of the recess seat 608 may envelope any portion of the base plate 606 that is equivalent to the intended rotational travel of the pivot eyeglass frame relative to the foundation eyeglass frame.

In various examples, the pivot plate 602 may include twice the number of magnets as the base plate 606. This may help improve the selective coupling of the pivot plate 602 to the base plate 606. Alternatively, the base plate 606 may include twice the number magnets relative the pivot plate 602, for purposes of the same rationale. In other examples, the base plate 606 and the pivot plate 602 may have the same number of magnets. Alternatively, or additionally, the pivot plate 602 may have different sized magnets or magnets of different strength relative to the base plate 606 magnets.

Figure 7A:
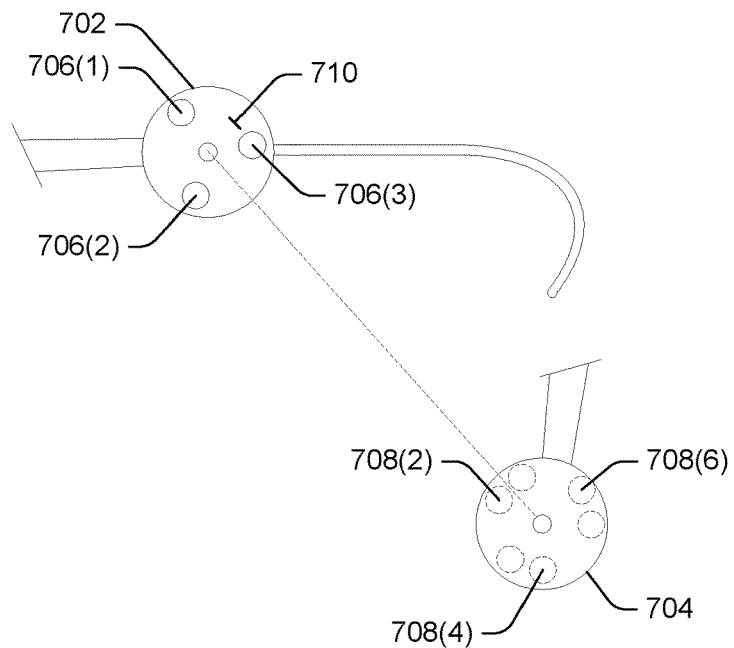
FIGS. 7A and 7B illustrates an exploded isometric view of a pivot mechanism of the dual-frame eyeglasses.
Figure 7B:
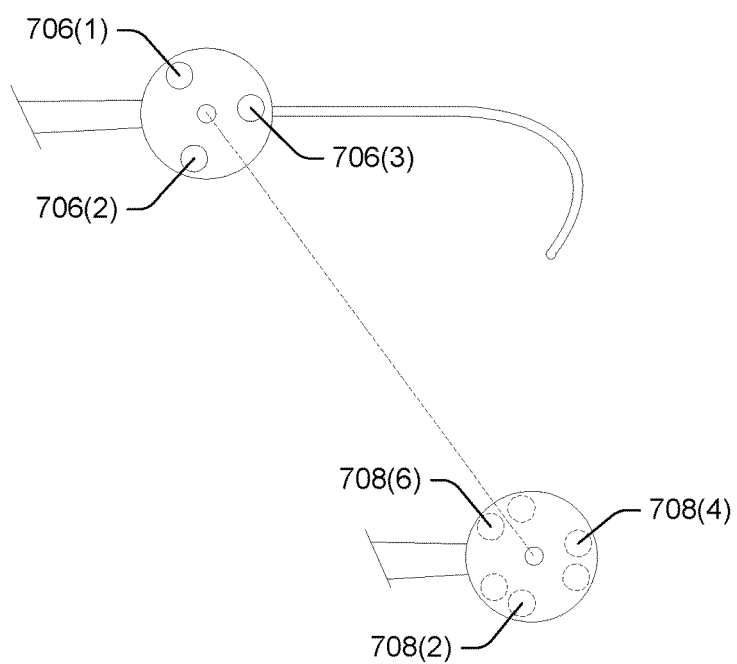

FIGS. 7A and 7B illustrates an exploded isometric view of a pivot mechanism for the dual-frame eyeglasses. FIG. 7A illustrates a first configuration of the pivot mechanism, whereby the pivot eyeglass frame rotates upward away from a user's line of sight. In the illustrated example, the pivot mechanism may comprise of a base plate 702 and a pivot plate 704. The base plate 702 may include magnets 706(1)-706(3) in situ that abut a corresponding mating surface of the pivot plate 704. It is noteworthy that the illustrated example displays three magnets. However, the base plate 702 may include any number of magnets. Similarly, the pivot plate 704 may include magnets 708(1)-708(4) in situ that abut a mating surface 710 of the base plate 702. It is noteworthy that the spacing of magnets 706(1)-706(3) on the base plate 702 are equidistant and substantially similar to the spacing of the grouped pair of magnets 708(1)-708(6) on the pivot plate 704. In turn, magnets 706(1)-706(3) may substantially overlap the grouped pair of magnets 708(1)-708(6), when the base plate 702 abuts the pivot plate 704, and also when the pivot plate 704 rotates relative to the base plate 702. Magnets 706(1)-706(3) may have a polarity that is substantially opposite to a polarity of magnets 708(1)-708(6). As a result, the opposing polarities may generate a magnetic force that attracts magnets 706(1)-706(3) to magnets 708(1)-708(6), causing a selective coupling of the base plate 702 and the pivot plate 704.

The first configuration illustrates an alignment and selective coupling of magnets 706(1)-706(3) on the base plate 702 and magnets 708(1)-708(6) on the pivot plate 704. In this configuration, the pivot plate 704 rotates the pivot arm 712 in an upward direction, which moves the pivot eyeglass frame away from a user's line of sight. For example, magnet 706(1) of the base plate 702 aligns with the grouped pair of magnets 708(1) and 708(2) of the pivot plate 704, magnet 706(2) of the base plate 702 aligns with the grouped pair of magnets 708(3) and 708(4) of the pivot plate 704, and so forth.

FIG. 7B illustrates a second configuration of the pivot mechanism, whereby the pivot plate 704 rotates the pivot arm 712 in a downward direction, which aligns the pivot eyeglass frame with a user's line of sight. For example, magnet 706(1) of the base plate 702 aligns with the grouped pair of magnets 708(5) and 708(6) of the pivot plate 704, magnet 706(2) of the base plate 702 aligns with the grouped pair of magnets 708(1) and 708(2) of the pivot plate 704, and so forth.

Figure 8A:
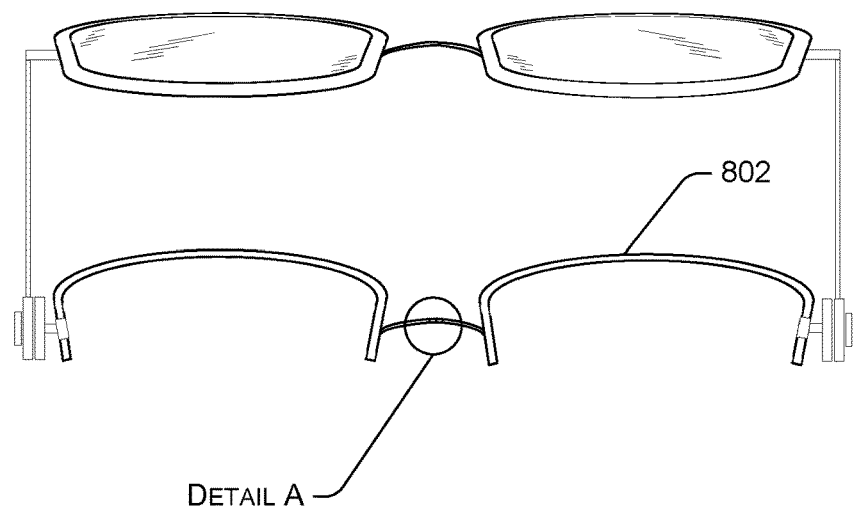
FIGS. 8A and 8B illustrate a view of a pair of dual-frame eyeglass, highlighting a magnetic coupling at a nose bridge of the foundation eyeglass frame.
Figure 8B:
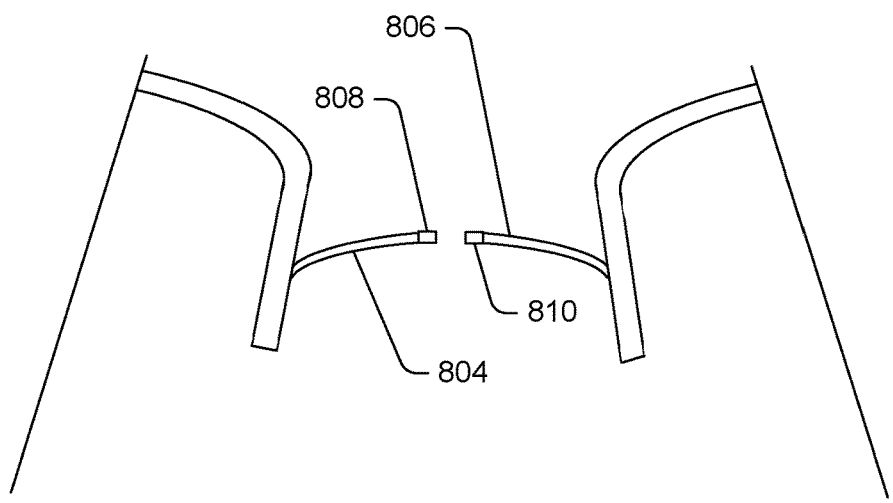

FIG. 8A illustrates a front view of a pair of dual-frame eyeglass that highlights a magnetic coupling at a nose bridge of the foundation eyeglass frame 802. FIG. 8B illustrates a detail view at Detail A of FIG. 8A, highlighting the magnetic coupling at the nose bridge.

In the illustrated example, the foundation eyeglass frame 802 may include a nose bridge that separates into two elements 804 and 806 at a coupling point. The purpose of doing may allow each half of the foundation eyeglass frame 802 to fold into a separate, compact form, as further described in FIG. 9. In some examples, each of the two elements 804 and 806 of the nose bridge may each have a length that is equivalent to substantially one half of the nose bridge. In other examples, the coupling point may be offset to one side of the nose bridge, such that the length of one element is more than one half of the total length of the nose bridge.

Further, the two elements 804 and 806 of the nose bridge may selectively couple, and uncouple from one another using magnets 808 and 810 that are rigidly fixed to the free ends of each element 804 and 806, respectively. For example, a first magnet 808 may be rigidly fixed to the free end of the first element 804 of the nose bridge, and a second magnet 810 may be rigidly fixed to the free end of the second element 806 of the nose bridge. Further, the first magnet 808 may have a polarity that is substantially opposite to a polarity of the second magnet 810. As a result, the opposing polarities may generate a magnetic force that attracts the first magnet 808 to the second magnet 810, causing a selective coupling of the two elements 804 and 806 of the nose bridge.

Figure 9A:
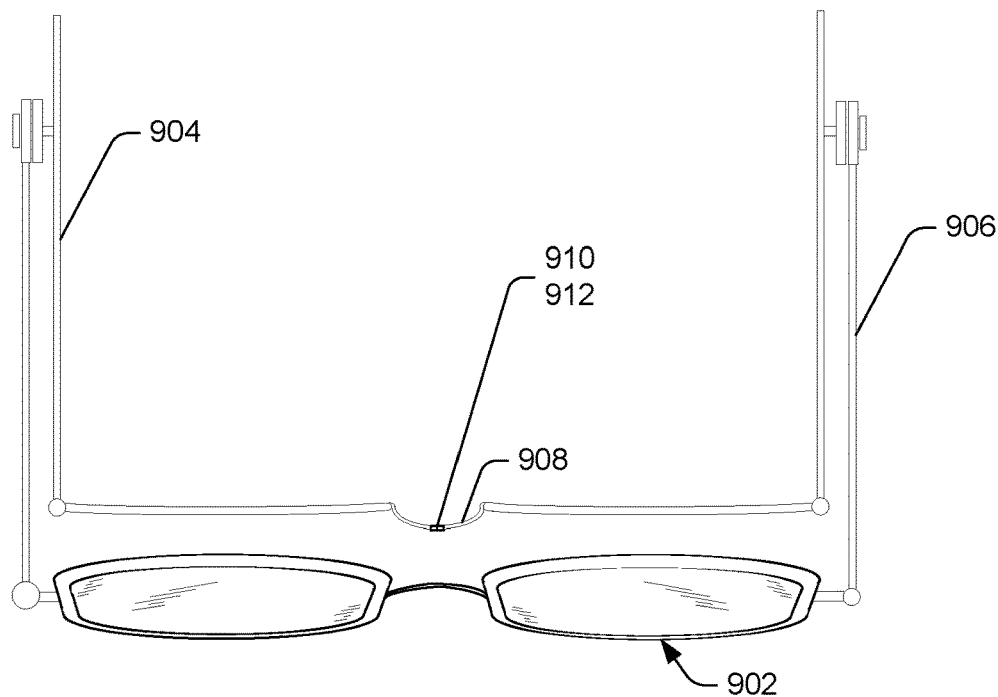
FIGS. 9A and 9B illustrate an exemplary pair of dual-frame eyeglasses in a first and second configuration.
Figure 9B:
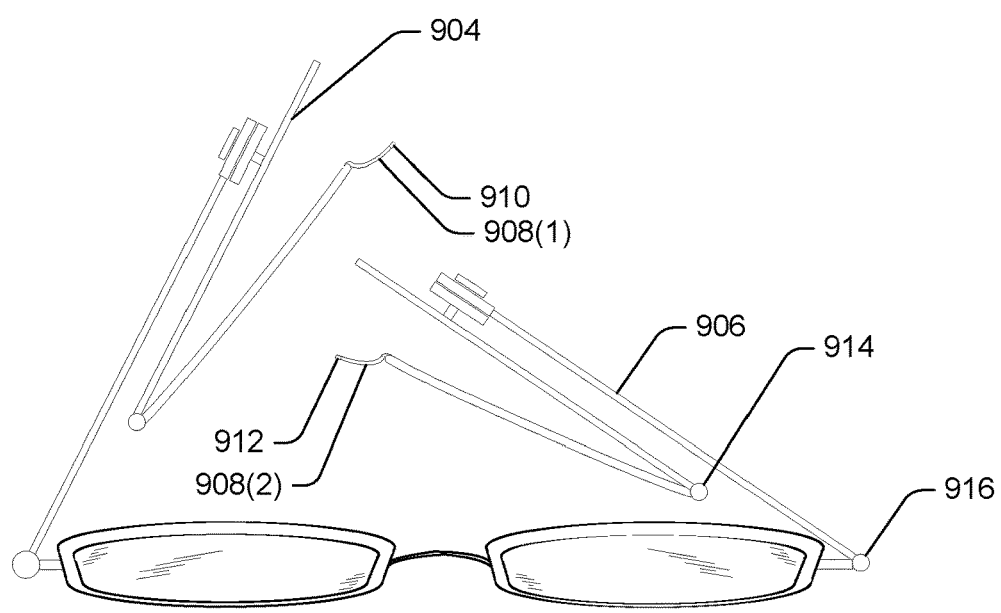

FIGS. 9A and 9B illustrate an exemplary pair of dual-frame eyeglasses 902 in a first and second configuration. FIG. 9A illustrates a first configuration of the pair of dual-frame eyeglasses 902 that are unfolded for use. In this example, a nose bridge 908 of the foundation eyeglass frame 904 may comprise of two elements that are selectively coupled to one another by the interaction of a first magnet 910 and a second magnet 912 at a coupling point. That is, the first magnet 910 and the second magnet 912 may be rigidly fixed to the free ends of each element of the nose bridge 908, respectively. Further, the magnetic force generated between the first magnet 910 and the second magnet 912 may selectively couple the two elements to one another.

FIG. 9B illustrates a second configuration of the pair of dual-frame eyeglasses 902, whereby the two elements of the nose bridge 908 are selectively uncoupled, allowing the pair of dual-frame eyeglasses 902 to fold into a more compact form relative to the first configuration shown in FIG. 9A. The first magnet 910 and the second magnet 912 of the nose bridge 908 may be uncoupled by applying a physical force that greater than the magnetic force generated by the first magnet 910 and the second magnet 912. Once the two elements of the nose bridge 908 are uncoupled, the foundation eyeglass frame 904 may fold into a compact form via rotation about hinges 914 and 916.

Figure 10A:
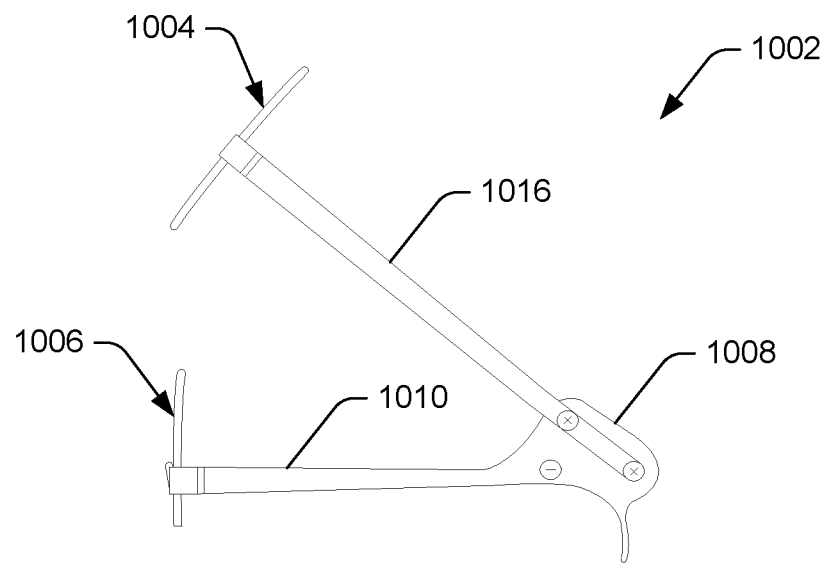
FIGS. 10A through to 10D illustrate an exemplary embodiment of a pair of dual-frame eyeglasses, comprising a pivot eyeglass frame that rotates about a pair of pivot points on a foundation eyeglass frame.
Figure 10B:
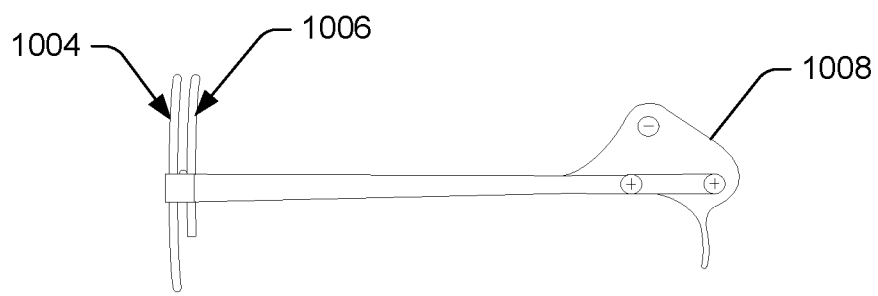
FIG. 10B illustrates an orientation of the pivot eyeglass frame that substantially overlaps the foundation eyeglass frame.

FIGS. 10A through to 10D illustrate an exemplary embodiment of a pair of dual-frame eyeglasses 1002, comprising a pivot eyeglass frame 1004 that rotates about a pair of pivot points on a foundation eyeglass frame 1006. In this example, the pivot points are located on a base plate 1008 that is integrated into each temple arm 1010 of the foundation eyeglass frame 1006. The base plate 1008 may be sized to include the pivot element 1012 and alignment elements 1014(2) and 1014(1). The pivot element 1012 may facilitate rotation of the pivot arm 1016 of the pivot eyeglass frame 1004 relative to the temple arm 1010 of the foundation eyeglass frame 1006, while the alignment elements 1014(2) and 1014(1) may help selectively couple the pivot eyeglass frame 1004 in one or more orientation(s) relative to the foundation eyeglass frame 1006. FIG. 10A illustrates a furthermost rotation of the pivot eyeglass frame 1004 relative to the foundation eyeglass frame 1006, while FIG. 10B illustrates an orientation of the pivot eyeglass frame 1004 that substantially overlaps the foundation eyeglass frame 1006.

Figure 10C:
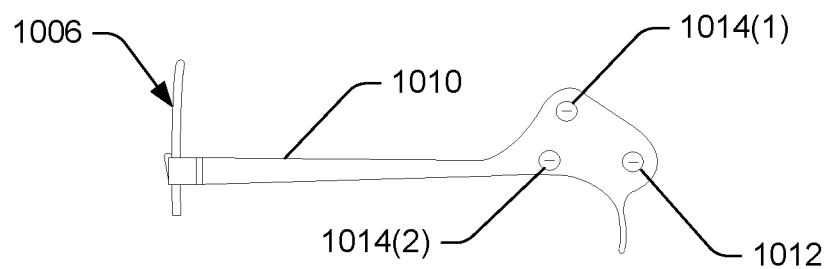
FIG. 10C illustrates an exemplary embodiment of the foundation eyeglass frame as depicted in FIGS. 10A and 10B.

FIG. 10C illustrates an exemplary embodiment of the foundation eyeglass frame 1006. The foundation eyeglass frame 1006 may include a base plate 1008 that is integrated into each temple arm 1010. Each base plate 1008 may be sized to include a pivot element 1012, at the pivot point, and alignment elements 1014(2) and 1014(1). The alignment elements 1014(2) and 1014(1) may help selectively couple the pivot eyeglass frame 1004 in one of two orientations relative to the foundation eyeglass frame 1006. For example, when alignment element 1014(1) and pivot element 1012 of the foundation eyeglass frame 1006 selectively couple to the alignment element 1018 and pivot element 1020 of the pivot eyeglass frame 1004 respectively, the pivot eyeglass frame 1004 may be at its furthermost rotation relative to the foundation eyeglass frame 1006. Additionally, when alignment element 1014(2) and pivot element 1012 of the foundation eyeglass frame 1006 selectively couple to the alignment element 1018 and pivot element 1020 of the pivot eyeglass frame 1004 respectively, the pivot eyeglass frame 1004 may substantially overlap the foundation eyeglass frame 1006, and the user's line of sight.

It is noteworthy that one or more additional alignment elements may be spaced between alignment element 1014(2) and 1014(1) on the base plate 1008 to enable intermediate angular orientations of the pivot eyeglass frame 1004 relative to the foundation eyeglass frame 1006.

In the illustrated example, the pivot element 1012 and the alignment element 1014(2) and 1014(1) may comprise of magnets that nest within recess seats of the base plate 1008. In other examples, the pivot element 1012 may comprise of any other fastening system that facilitates rotation about an axis perpendicular to adjoining surfaces, such as a screw, bolt, or lock-pin fastening system. Additionally, the alignment element 1014(2) and 1014(1) may comprise of any fastening system that restricts translation between adjoining surfaces, such as a screw, bolt, lock-pin, or a VELCRO (Registered trademark) fastening system.

Figure 10D:
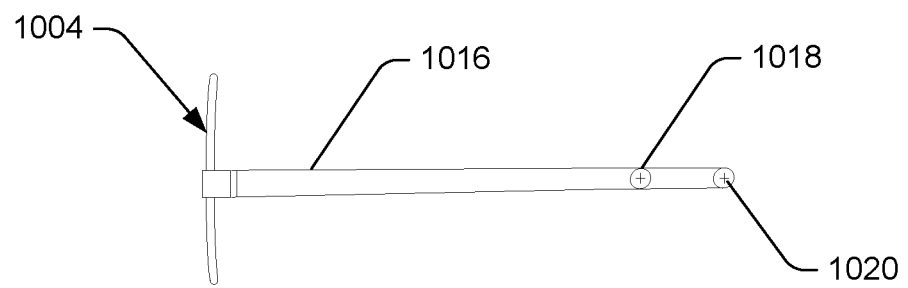
FIG. 10D illustrates an exemplary embodiment of the pivot eyeglass frame as depicted in FIGS. 10A and 10B.

FIG. 10D illustrates an exemplary embodiment of the pivot eyeglass frame 1004 as depicted in FIGS. 10A and 10B. The pivot eyeglass frame 1004 may include a pivot element 1020 and an alignment element 1018 on each pivot arm 1016. The pivot element 1020 may be located substantially near the free end of each pivot arm 1016. Further, the alignment element 1018 may be offset from the pivot element 1020 by a distance that is substantially similar to the offset between the alignment elements 1014(2) or 1014(1) and the pivot element 1012 of the foundation eyeglass frame 1006. In doing so, the alignment element 1018 on each pivot arm 1016 may overlap and selectively couple to one of the alignment elements 1014(2) or 1014(1) while the pivot elements 1012 and 1020 are coupled.

In the illustrated example, the pivot element 1020 and the alignment element 1018 of the pivot eyeglass frame 1004 are magnets that nest within recess seats of the pivot arm 1016. The pivot element 1020 magnet may have a polarity that is substantially opposite to the polarity of the pivot element 1012 magnet of the foundation eyeglass frame 1006. As a result, a magnetic force generated between the pair of pivot elements 1012 and 1020 magnets may facilitate rotation of the pivot eyeglass frame 1004 relative to the foundation eyeglass frame 1006. Additionally, the alignment element 1018 magnet of the pivot eyeglass frame 1004 may have a polarity that is substantially opposite to the polarity of the alignment element 1014(2) and 1014(1) magnets of the foundation eyeglass frame 1006. Similarly, a magnetic force generated between the alignment element 1018 magnet and the alignment element 1014(2) or 1104(2) magnet may selectively couple an orientation of the pivot eyeglass frame 1004 to the foundation eyeglass frame 1006.

Furthermore, the pivot element 1020 of the pivot eyeglass frame 1004 may comprise of any fastening system that facilitates rotation about an axis perpendicular to adjoining surfaces, such as a screw, bolt, or lock-pin fastening system.

Additionally, the alignment element 1018 of the pivot eyeglass frame 1004 may comprise of any fastening system that restricts translation between adjoining surfaces, such as a screw, bolt, lock-pin, or VELCRO (Registered trademark) fastening system.

Figure 11A:
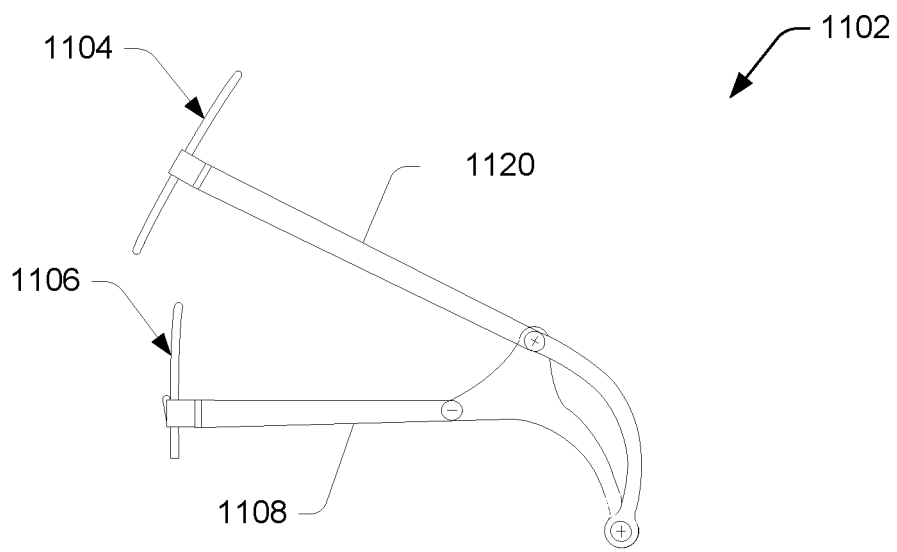
FIGS. 11A through to 11D illustrate an exemplary embodiment of a pair of dual-frame eyeglasses, comprising a pivot eyeglass frame that rotates about a pair of pivot points on a foundation eyeglass frame.
Figure 11B:
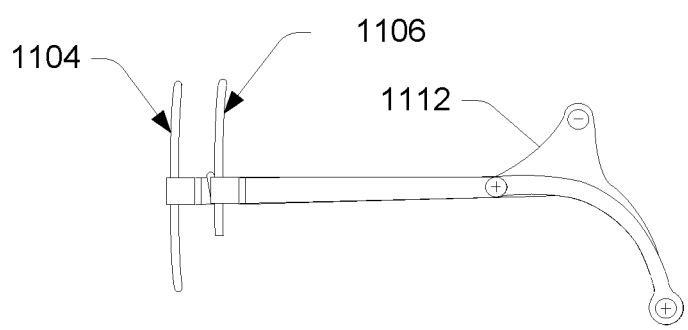
FIG. 11B illustrates an orientation of the pivot eyeglass frame that substantially overlaps the foundation eyeglass frame.

FIGS. 11A through to 11D illustrate an exemplary embodiment of a pair of dual-frame eyeglasses 1102, comprising a pivot eyeglass frame 1104 that rotates about a pair of pivot points on a foundation eyeglass frame 1106. In this example, the pivot points may be located substantially near the free end of each temple arm 1108 of the foundation eyeglass frame 1106. FIG. 11A illustrates a furthermost rotation of the pivot eyeglass frame 1104 relative to the foundation eyeglass frame 1106, while FIG. 11B illustrates an orientation of the pivot eyeglass frame 1104 that substantially overlaps the foundation eyeglass frame 1106.

Figure 11C:
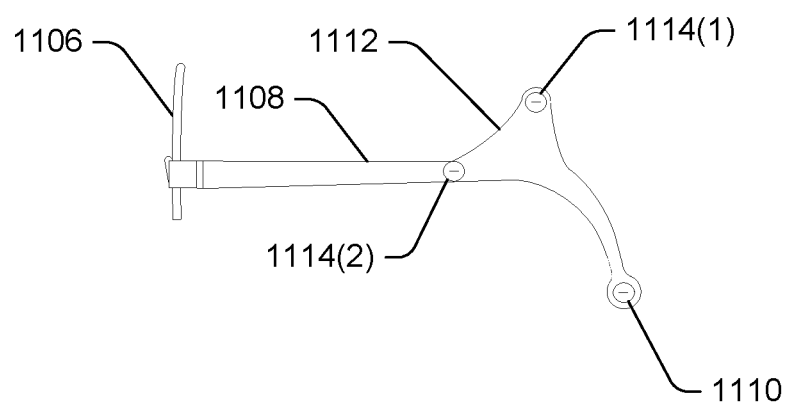
FIG. 11C illustrates an exemplary embodiment of the foundation eyeglass frame as depicted in FIGS. 11A and 11B.

FIG. 11C illustrates an exemplary embodiment of the foundation eyeglass frame 1106. The foundation eyeglass frame 1106 may include a pivot element 1110 at the pivot point on each temple arm 1108. Further, a fingerlike protrusion 1112 may be integrated into each temple arm 1108. Each fingerlike protrusion 1112 may be sized to include an alignment element 1114(1) that helps selectively couple the pivot eyeglass frame 1104 in a furthermost rotation relative to the foundation eyeglass frame 1106. In other words, when the alignment element 1114(1) and pivot element 1110 of the foundation eyeglass frame 1106 selectively couple to the alignment element 1116 and pivot element 1118 of the pivot eyeglass frame 1104 respectively, the pivot eyeglass frame 1104 may be at its furthermost rotation relative the foundation eyeglass frame 1106.

Additionally, the foundation eyeglass frame 1106 may include another alignment element 1114(2) that is positioned along the longitudinal axis of the temple arm 1108. The alignment element 1114(2) may enable the pivot eyeglass frame 1104 to selectively couple to the foundation eyeglass frame 1106 in an orientation that substantially overlaps the foundation eyeglass frame 1106. In other words, when the alignment element 1114(2) and pivot element 1110 of the foundation eyeglass frame 1106 selectively couple to the alignment element 1116 and pivot element 1118 of the pivot eyeglass frame 1104 respectively, the pivot eyeglass frame 1104 may substantially overlap the foundation eyeglass frame 1106, and the user's line of sight.

It is noteworthy that one or more additional alignment elements may be spaced between alignment element 1114(1) and 1114(2) to enable intermediate angular orientations of the pivot eyeglass frame 1104 relative to the foundation eyeglass frame 1106.

In the illustrated example, the pivot element 1110 and the alignment element 1114(1) and 1114(2) of the foundation eyeglass frame 1106 may comprise of magnets that nest within recess seats of the temple arm 1108 and the fingerlike protrusion 1112. In other examples, the pivot element 1110 may comprise of any other fastening system that facilitates rotation about an axis perpendicular to adjoining surfaces, such as a screw, bolt, or lock-pin fastening system. Additionally, the alignment elements 1114(1) and 1114(2) may comprise of any fastening system that restricts translation between adjoining surfaces, such as a screw, bolt, lock-pin, or a VELCRO (Registered trademark) fastening system.

Figure 11D:
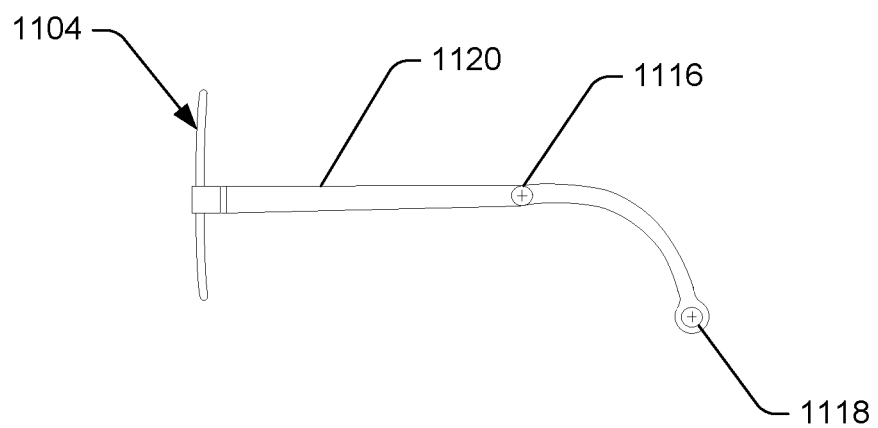
FIG. 11D illustrates an exemplary embodiment of the pivot eyeglass frame as depicted in FIGS. 11A and 11B.

FIG. 11D illustrates an exemplary embodiment of the pivot eyeglass frame 1104 as depicted in FIGS. 11A and 11B. The pivot eyeglass frame 1104 may include the pivot element 1118 and the alignment element 1116 on each pivot arm 1120. The pivot element 1118 may be located substantially near the free end of each pivot arm 1120. Further, the alignment element 1116 may be offset from the pivot element 1118 by a distance that is substantially similar to the offset between the alignment elements 1114(1) or 1114(2) and the pivot element 1110 of the foundation eyeglass frame 1106. In doing so, the alignment element 1116 on each pivot arm 1120 may overlap and selectively couple to one of the alignment elements 1114(1) or 1114(2) while the pivot elements 1110 and 1118 are coupled.

In the illustrated example, the pivot element 1118 and the alignment element 1116 of the pivot eyeglass frame 1104 are magnets that nest within recess seats of each pivot arm 1120. The pivot element 1118 magnet may have a polarity that is substantially opposite to the polarity of the pivot element 1110 magnet of the foundation eyeglass frame 1106. As a result, a magnetic force generated between the pair of pivot element 1110 and 1118 magnets may facilitate rotation of the pivot eyeglass frame 1104 relative to the foundation eyeglass frame 1106. Additionally, the alignment element 1116 magnet of the pivot eyeglass frame 1104 may have a polarity that is substantially opposite to the polarity of the alignment element 1114(1) and 1114(2) magnets of the foundation eyeglass frame 1106. Similarly, a magnetic force generated between the alignment element 1116 magnet and the alignment element 1114(1) or 1114(2) magnets may selectively couple an orientation of the pivot eyeglass frame 1104 to the foundation eyeglass frame 1106.

Furthermore, the pivot element 1118 of the pivot eyeglass frame 1104 may comprise of any fastening system that facilitates rotation about an axis perpendicular to adjoining surfaces, such as a screw, bolt, or lock-pin fastening system. Additionally, the alignment element 1116 of the pivot eyeglass frame 1104 may comprise of any fastening system that restricts translation between adjoining surfaces, such as a screw, bolt, lock-pin, or VELCRO (Registered trademark) fastening system.

Figure 12A:
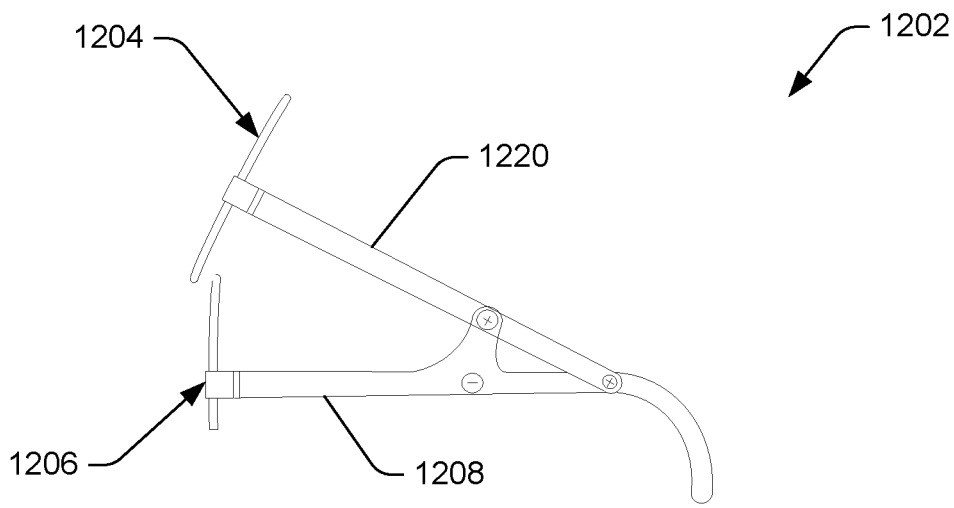
FIGS. 12A through to 12D illustrate an exemplary embodiment of a pair of dual-frame eyeglasses, comprising a pivot eyeglass frame that rotates about a pair of pivot points on a foundation eyeglass frame.

FIGS. 12A through to 12D illustrate an exemplary embodiment of a pair of dual-frame eyeglasses 1202, comprising a pivot eyeglass frame 1204 that rotates about a pair of pivot points on a foundation eyeglass frame 1206. In this example, the pivot points may be located on the temple arm 1208 of the foundation eyeglass frame 1206. More specifically, the pivot points may be located forward of the bend in the temple arm 1208 that is intended to wrap behind a user's ear. FIG. 12A illustrates a furthermost rotation of the pivot eyeglass frame 1204 relative to the foundation eyeglass frame 1206, while FIG. 12B illustrates an orientation of the pivot eyeglass frame 1204 that substantially overlaps the foundation eyeglass frame 1206.

Figure 12B:
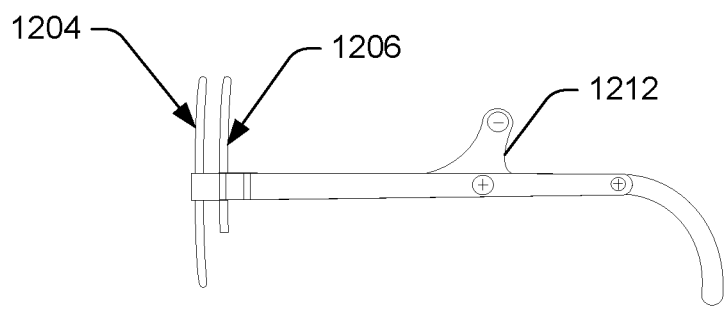
FIG. 12B illustrates an orientation of the pivot eyeglass frame that substantially overlaps the foundation eyeglass frame.
Figure 12C:
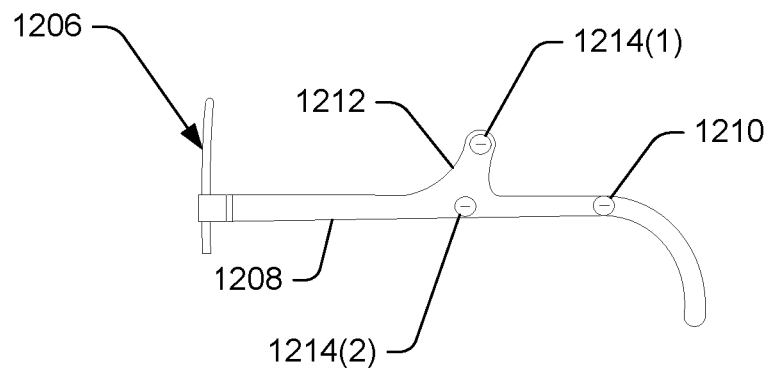
FIG. 12C illustrates an exemplary embodiment of the foundation eyeglass frame as depicted in FIGS. 12A and 12B.

FIG. 12C illustrates an exemplary embodiment of the foundation eyeglass frame 1206 as depicted in FIGS. 12A and 12B. The foundation eyeglass frame 1206 may include a pivot element 1210 at the pivot point on each temple arm 1208. Further, a fingerlike protrusion 1212 may be integrated into each temple arm 1208. Each fingerlike protrusion 1212 may be sized to include an alignment element 1214(1) that helps selectively couple the pivot eyeglass frame 1204 in a furthermost rotation relative to the foundation eyeglass frame 1206. In other words, when the alignment element 1214(1) and pivot element 1210 of the foundation eyeglass frame 1206 selectively couple to the alignment element 1216 and pivot element 1218 of the pivot eyeglass frame 1204 respectively, the pivot eyeglass frame 1204 may be at its furthermost rotation relative to the foundation eyeglass frame 1206.

Additionally, the foundation eyeglass frame 1206 may include another alignment element 1214(2) that is positioned along the longitudinal axis of the temple arm 1208. The alignment element 1214(2) may enable the pivot eyeglass frame 1204 to selectively couple to the foundation eyeglass frame 1206 in an orientation that substantially overlaps the foundation eyeglass frame 1206. In other words, when the alignment element 1214(2) and pivot element 1210 of the foundation eyeglass frame 1206 selectively couple to the alignment element 1216 and pivot element 1218 of the pivot eyeglass frame 1204 respectively, the pivot eyeglass frame 1204 may substantially overlap the foundation eyeglass frame 1206, and the user's line of sight.

It is noteworthy that one or more additional alignment elements may be spaced between alignment elements 1214(1) and 1214(2) to enable intermediate angular orientations of the pivot eyeglass frame 1204 relative to the foundation eyeglass frame 1206.

In the illustrated example, the pivot element 1210 and the alignment element 1214(1) and 1214(2) of the foundation eyeglass frame 1206 may comprise of magnets that nest within recess seats of the temple arm 1208 and fingerlike protrusion 1212. In other examples, the pivot element 1210 may comprise of any other fastening system that facilitates rotation about an axis perpendicular to adjoining surfaces, such as a screw, bolt, or lock-pin fastening system. Additionally, the alignment elements 1214(1) and 1214(2) may comprise of any fastening system that restricts translation between adjoining surfaces, such as a screw, bolt, lock-pin, or a VELCRO (Registered trademark) fastening system.

Figure 12D:
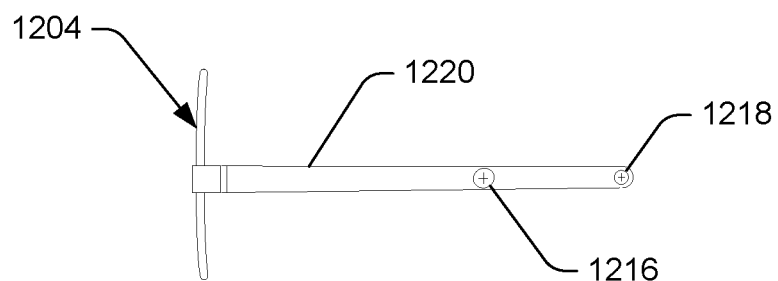
FIG. 12D illustrates an exemplary embodiment of the pivot eyeglass frame as depicted in FIGS. 12A and 12B.

FIG. 12D illustrates an exemplary embodiment of the pivot eyeglass frame 1204 as depicted in FIGS. 12A and 12B. The pivot eyeglass frame 1204 may include the pivot element 1218 and the alignment element 1216 on each pivot arm 1220. The pivot element 1218 may be located substantially near the free end of each pivot arm 1220. Further, the alignment element 1216 may be offset from the pivot element 1218 by a distance that is substantially similar to the offset between the alignment elements 1214(1) or 1214(2) and the pivot element 1210 of the foundation eyeglass frame 1206. In doing so, the alignment element 1216 on each pivot arm 1220 may overlap and selectively couple to one of the alignment elements 1214(1) or 1214(2) while the pivot elements 1210 and 1218 are coupled.

In the illustrated example, the pivot element 1218 and the alignment element 1216 of the pivot eyeglass frame 1204 are magnets that nest within recess seats of each pivot arm 1220. The pivot element 1218 magnet may have a polarity that is substantially opposite to the polarity of the pivot element 1210 magnet of the foundation eyeglass frame 1206. As a result, a magnetic force generated between the pair of pivot element 1210 and 1218 magnets may facilitate rotation of the pivot eyeglass frame 1204 relative to the foundation eyeglass frame 1206. Additionally, the alignment element 1216 magnet of the pivot eyeglass frame 1204 may have a polarity that is substantially opposite to the polarity of the alignment element 1214(1) and 1214(2) magnets of the foundation eyeglass frame 1206. Similarly, a magnetic force generated between the alignment element 1216 magnet and the alignment element 1214(1) or 1214(2) magnet may selectively couple an orientation of the pivot eyeglass frame 1204 to the foundation eyeglass frame 1206.

Furthermore, the pivot element 1218 of the pivot eyeglass frame 1204 may comprise of any fastening system that facilitates rotation about an axis perpendicular to adjoining surfaces, such as a screw, bolt, or lock-pin fastening system. Additionally, the alignment element 1216 of the pivot eyeglass frame 1204 may comprise of any fastening system that restricts translation between adjoining surfaces, such as a screw, bolt, lock-pin, or VELCRO (Registered trademark) fastening system.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A pair of dual-frame eyeglasses, comprising:
    a pivot eyeglass frame that includes a pivot-lens support frame for holding a left focus lens unit and a right focus lens unit, the pivot eyeglass frame further comprising:
        a left pivot arm that is rigidly fixed to a first left outer portion of the pivot-lens support frame via a first left hinge, the left pivot arm being further rigidly fixed to a left pivot mechanism; and
        a right pivot arm that is rigidly fixed to a first right outer portion of the pivot-lens support frame via a first right hinge, the right pivot arm being further rigidly fixed to a right pivot mechanism;
    a foundation eyeglass frame that includes a foundation-lens support frame, the foundation eyeglass frame further comprising:
        a left temple arm that is rigidly fixed to a second left outer portion of the foundation eyeglass frame via a second left hinge, the left temple arm being further rigidly fixed to the left pivot mechanism; and
        a right temple arm that is rigidly fixed to a second right outer portion of the foundation eyeglass frame via a second right hinge, the right temple arm being further rigidly fixed to the right pivot mechanism; and
    the left pivot mechanism being configured to selectively couple the left pivot arm at one of a plurality of incremental angular offsets relative to the left temple arm via a magnetic interaction between a first set of magnets that are rigidly fixed to the left temple arm and a second set of magnets that are rigidly fixed to the left pivot arm, wherein a first number of magnets of the first set of magnets is double that of a second number of magnets of the second set of magnets, and
    wherein the right pivot mechanism for coupling the right pivot arm and the right temple arm is a mirror image of the left pivot mechanism.

2. The pair of dual-frame eyeglasses of claim 1, wherein the left pivot mechanism is configured to restrict translational movement of the left pivot arm relative to the left temple arm.

3. The pair of dual-frame eyeglasses of claim 1, wherein the foundation eyeglass frame further comprises a nose bridge, the nose bridge comprising a left longitudinal member and a right longitudinal member, wherein:
    the left longitudinal member comprises a left first end and a left second end, wherein the left first end is rigidly fixed to a left inner portion of the foundation-lens support frame, and the left second end having a rigidly fixed first magnet,
    the right longitudinal member comprises a right first end and a right second end, wherein the right first end is rigidly fixed to a right inner portion of the foundation-lens support frame, and the right second end having a rigidly fixed second magnet, and the rigidly fixed first magnet having a first polarity that is opposite to a second polarity of the rigidly fixed second magnet.

4. The pair of dual-frame eyeglasses of claim 1, wherein the left focus lens unit is a first left focus lens unit and the right focus lens unit is a first right focus lens unit, and further comprising:
the foundation eyeglass frame being configured for holding a second left focus lens unit and a second right focus lens unit.

5. The pair of dual-frame eyeglasses of claim 1, further comprising:
a left arm catch that is rigidly fixed to the left pivot arm of the pivot eyeglass frame, the left arm catch protruding inward towards the left temple arm of the foundation eyeglass frame such that the left arm catch abuts the left temple arm in response to a downward rotation of the pivot eyeglass frame relative to the foundation eyeglass frame; and
a right arm catch that is rigidly fixed to the right pivot arm of the pivot eyeglass frame, the right arm catch protruding inward towards the right temple arm of the foundation eyeglass frame such that the right arm catch abuts the right temple arm in response to the downward rotation of the pivot eyeglass frame relative to the foundation eyeglass frame.

6. The pair of dual-frame eyeglasses of claim 1, wherein the first set of magnets has a first polarity and the second set of magnets has a second polarity that is opposite the first polarity.

7. The pair of dual-frame eyeglasses of claim 1, wherein the left pivot mechanism comprises a first base plate and a first pivot plate, the first base plate being rigidly fixed to a particular location on the left temple arm of the foundation eyeglass frame, the first base plate further including the first set of magnets,
wherein, the first pivot plate is rigidly fixed to a free end of the left pivot arm of the pivot eyeglass frame, the first pivot plate including the set of second magnets, and further comprising:
a fastening system that couples the first base plate to the first pivot plate through a rotational centroid of the first pivot plate.

8. The pair of dual-frame eyeglasses of claim 7, wherein the fastening system that couples the first base plate to the first pivot plate comprises of a pair of magnets, wherein a first magnet of the pair of magnets has a first polarity and nests within a first recess seat of the first base plate, and a second magnet of the pair of magnets has a second polarity that is opposite the first polarity and nests within a second recess seat of the first pivot plate.

9. The pair of dual-frame eyeglasses of claim 7, wherein the particular location that the first base plate is rigidly fixed to the left temple arm is based at least in part on enabling the pivot-lens support frame of the pivot eyeglass frame to overlap the foundation-lens support frame of the foundation eyeglass frame in response to a downward rotation of the pivot eyeglass frame relative to the foundation eyeglass frame.

10. An eyeglass frame assembly, comprising:
a pivot eyeglass frame that includes a pivot-lens support frame for holding a left focus lens unit and a right focus lens unit, the pivot eyeglass frame further comprising a left pivot arm and a right pivot arm, wherein:
the left pivot arm is rigidly fixed to a first left outer portion of the pivot-lens support frame via a first left hinge, the left pivot arm including a first left pivot element and a first left alignment element, the first left alignment element including a first number of left alignment magnets;
the right pivot arm is rigidly fixed to a first right outer portion of the pivot-lens support frame via a first right hinge, the right pivot arm including a first right pivot element and a first right alignment element, the first right alignment element including a first number of right alignment magnets;
a foundation eyeglass frame that includes a foundation-lens support frame, the foundation eyeglass frame further comprising a left temple arm and a right temple arm, wherein:
the left temple arm is rigidly fixed to a second left outer portion of the foundation-lens support frame via a second left hinge, the left temple arm including a second left pivot element and a second left alignment element, the second left alignment element including a second number of left alignment magnets, wherein the second number of left alignment magnets is double that of the first number of left alignment magnets;
the right temple arm is rigidly fixed to a second right outer portion of the foundation-lens support frame via a second right hinge, the right temple arm including a second right pivot element and a second right alignment element, the second right alignment element including a second number of right alignment magnets, wherein the second number of right alignment magnets is double that of the first number of right alignment magnets; and
wherein the pivot eyeglass frame is selectively coupled to the foundation eyeglass frame at one of a plurality of incremental angular offsets via at least a first magnetic interaction between the first left alignment element and the second left alignment element and a second magnetic interaction between the first right alignment element and the second right alignment element.

11. The eyeglass frame assembly of claim 10, wherein the first left pivot element of the pivot eyeglass frame is located at a first free end of the left pivot arm, the first free end being opposite to first left hinge that is rigidly fixed to the pivot-lens support frame, and
wherein, the first right pivot element is located at a second free end of the right pivot arm, the seocnd free end being opposite to the first right hinge that is rigidly fixed to the pivot-lens support frame.

12. The eyeglass frame assembly of claim 10, wherein a coupling of the second left alignment element to the first left alignment element and the second right alignment element to the first right alignment element enables the pivot-lens support frame of the pivot eyeglass frame to overlap the foundation-lens support frame of the foundation eyeglass frame in response to a downward rotation of the pivot eyeglass frame relative to the foundation eyeglass frame.

13. The eyeglass frame assembly of claim 10, wherein the first left alignment element and the first right alignment element comprise of first magnets that have a first polarity,
wherein, the second left alignment element and the second right alignment element comprise of second magnets that have a second polarity that is opposite the first polarity.

14. The eyeglass frame assembly of claim 13, wherein the first magnets are positioned to nest within first recess seats of the left pivot arm and the right pivot arm, the first recess seats having a first perimeter geometry and a first depth that is sized to fit the first magnets, and wherein the second magnets are positioned to nest within second recess seats of the left temple arm and the right temple arm, the second recess seats having a second perimeter geometry and a second depth that is sized to fit the second magnets.

15. The eyeglass frame assembly of claim 10, wherein the first left alignment element corresponds to a first magnet and the second left alignment element corresponds to a plurality of second magnets, and wherein the left temple arm includes a left protrusion that is sized to nest and orient the plurality of second magnets of the second left alignment element in positions that enable one of the plurality of second magnets to couple with the first magnet of the first left alignment element of the pivot eyeglass frame, and wherein, the right temple arm includes a right protrusion that is a mirror image of the left protrusion of the left temple arm.

16. The eyeglass frame assembly of claim 15, wherein one of the positions of the plurality of second magnets of the second left alignment element is based at least in part on selectively coupling the pivot eyeglass frame at a furthermost upward rotation relative to the foundation eyeglass frame.

17. A dual-frame eyeglass apparatus, comprising a pivot eyeglass frame and a foundation eyeglass frame, wherein:

the pivot eyeglass frame that includes a pivot-lens support frame for holding a left focus lens unit and a right focus lens unit, the pivot eyeglass frame further comprising a left pivot arm and a right pivot arm, wherein:

the left pivot arm is rigidly fixed to a first left outer portion of the pivot-lens support frame via a first left hinge, the left pivot arm including a first left pivot magnet and a first set of left alignment magnets, the first left pivot magnet and the first set of left alignment magnets having a first polarity, and the right pivot arm is rigidly fixed to a first right outer portion of the pivot-lens support frame via a first right hinge, the right pivot arm including a first right pivot magnet and a first set of right alignment magnets, the first right pivot magnet and the first set of right alignment magnets having the first polarity; and the foundation eyeglass frame that includes a foundation-lens support frame, the foundation eyeglass frame further comprising a left temple arm and a right temple arm, wherein:

the left temple arm is rigidly fixed to a second left outer portion of the foundation-lens support frame via a second left hinge, the left temple arm having a left protrusion that is sized for nesting a second set of left alignment magnets, the left temple arm further including a second left pivot magnet, the second left pivot magnet and the second set of left alignment magnets having a second polarity that is opposite the first polarity, and wherein a second number of left alignment magnets of the second set of left alignment magnets is double that of a first number of left alignment magnets of the first set of left alignment magnets, the right temple arm is rigidly fixed to a second right outer portion of the foundation-lens support frame via a second right hinge, the right temple arm having a right protrusion that is sized for nesting a second set of right alignment magnets, the right temple arm further including a second right pivot magnet, the second right pivot magnet and the second set of right alignment magnets having the second polarity that is opposite the first polarity, and wherein a second number of right alignment magnets of the second set of right alignment magnets is double that of a first number of right alignment magnets of the first set of right alignment magnets, and wherein, the pivot eyeglass frame is selectively coupled to the foundation eyeglass frame at one of a plurality of incremental angular offsets via at least a first magnetic interaction between the first set of left alignment magnet and one second left magnet of the second set of left alignment magnets, and a second magnetic interaction between the first set of right alignment magnets and one second right magnet of the second set of right alignment magnets.

18. The dual-frame eyeglass apparatus of claim 17, wherein the second left pivot magnet of the foundation eyeglass frame is located at a free end of the left temple arm, the free end being opposite to the second left hinge that is rigidly fixed to the foundation-lens support frame, and wherein, the second right pivot magnet is located at a mirror image position on the right temple arm as the second left pivot magnet is located on the left temple arm.

19. The dual-frame eyeglass apparatus of claim 17, wherein the left temple arm includes a straight portion and a bent portion, the straight portion extending rearward towards a free end of the left temple arm and the bent portion extending forward from the free end, the bent portion being formed to partially overlap a user's ear, wherein, the second left pivot magnet is located on the straight portion of the left temple arm, and wherein, the second right pivot magnet is located on a mirror image position of the right temple arm as the second left pivot magnet is located on the left temple arm.

20. The dual-frame eyeglass apparatus of claim 17, wherein the left protrusion is further sized to orient the second set of left alignment magnets in positions that enable the second set of left alignment magnets to selectively couple with the first set of left alignment magnets of the pivot eyeglass frame when the first left pivot magnet of the pivot eyeglass frame selectively couples with the second left pivot magnet of the foundation eyeglass frame, and wherein, the right protrusion is a mirror image of the left protrusion of the left temple arm.

* * * * *